H. E. WRAY.
RUNNING GEAR FOR MOTOR VEHICLES.
APPLICATION FILED JUNE 4, 1909.
967,698.
Patented Aug. 16, 1910.
3 SHEETS—SHEET 2.
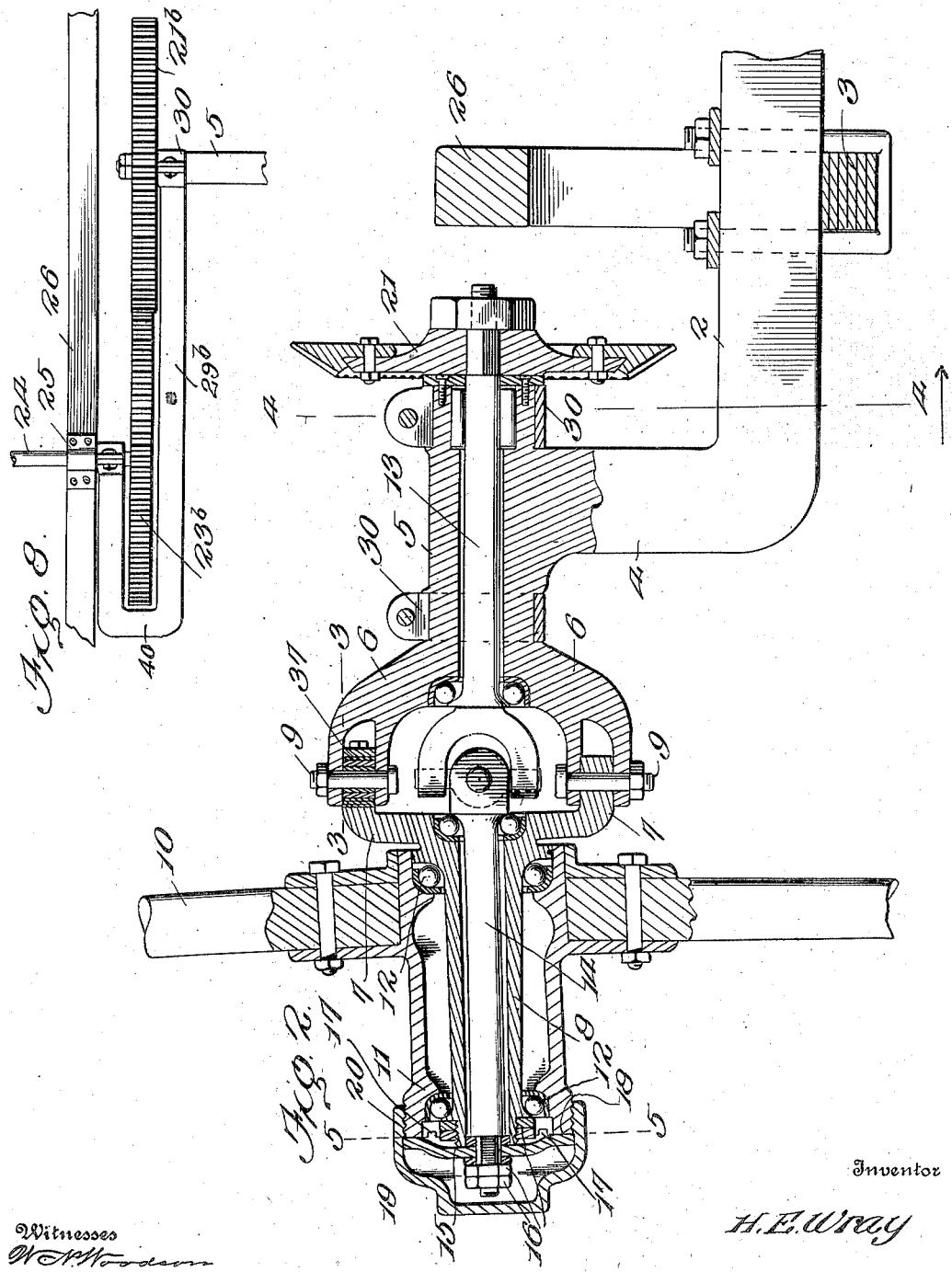
Witnesses
Inventor
H. E. Wray
By Attorneys.

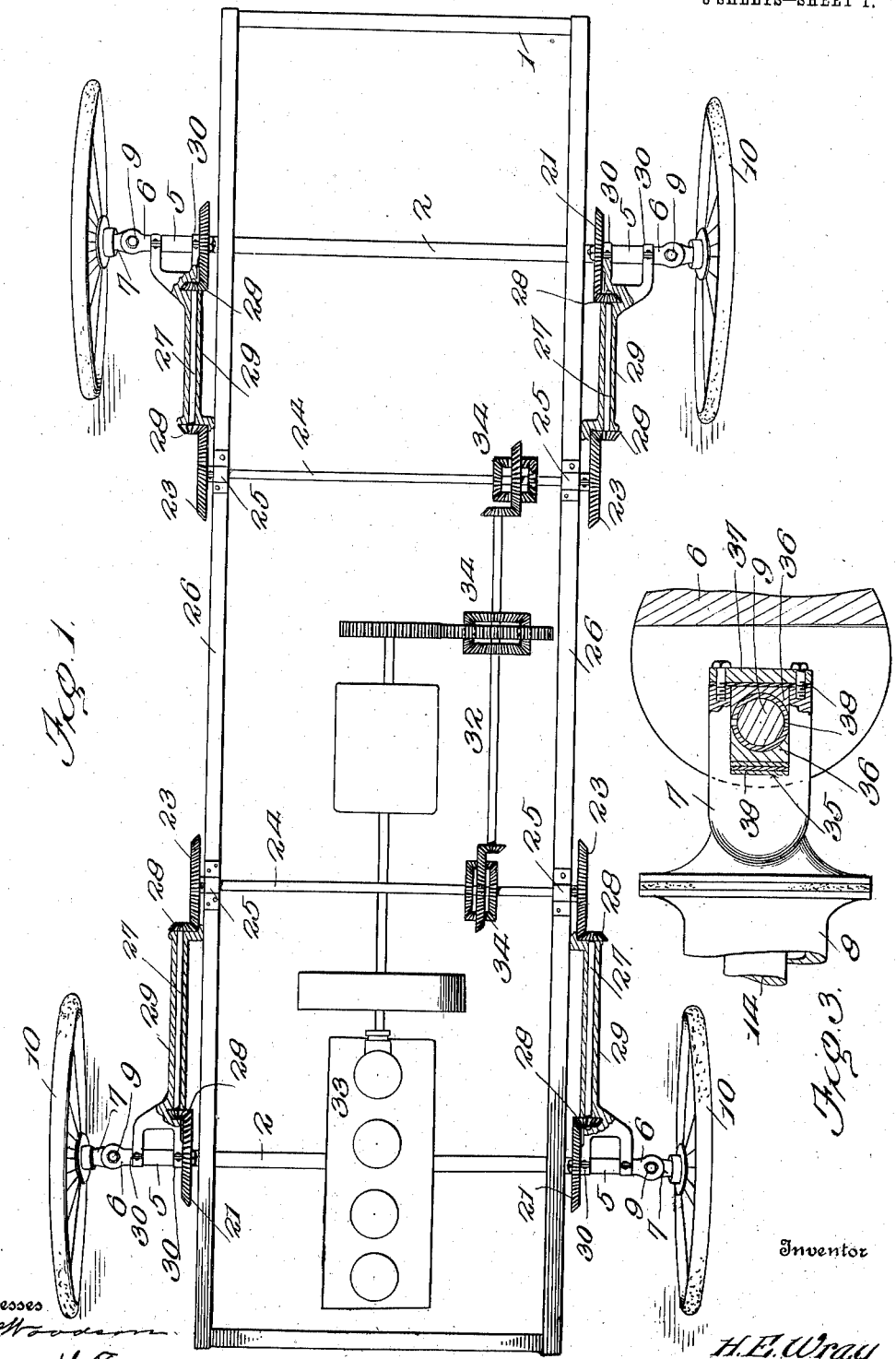

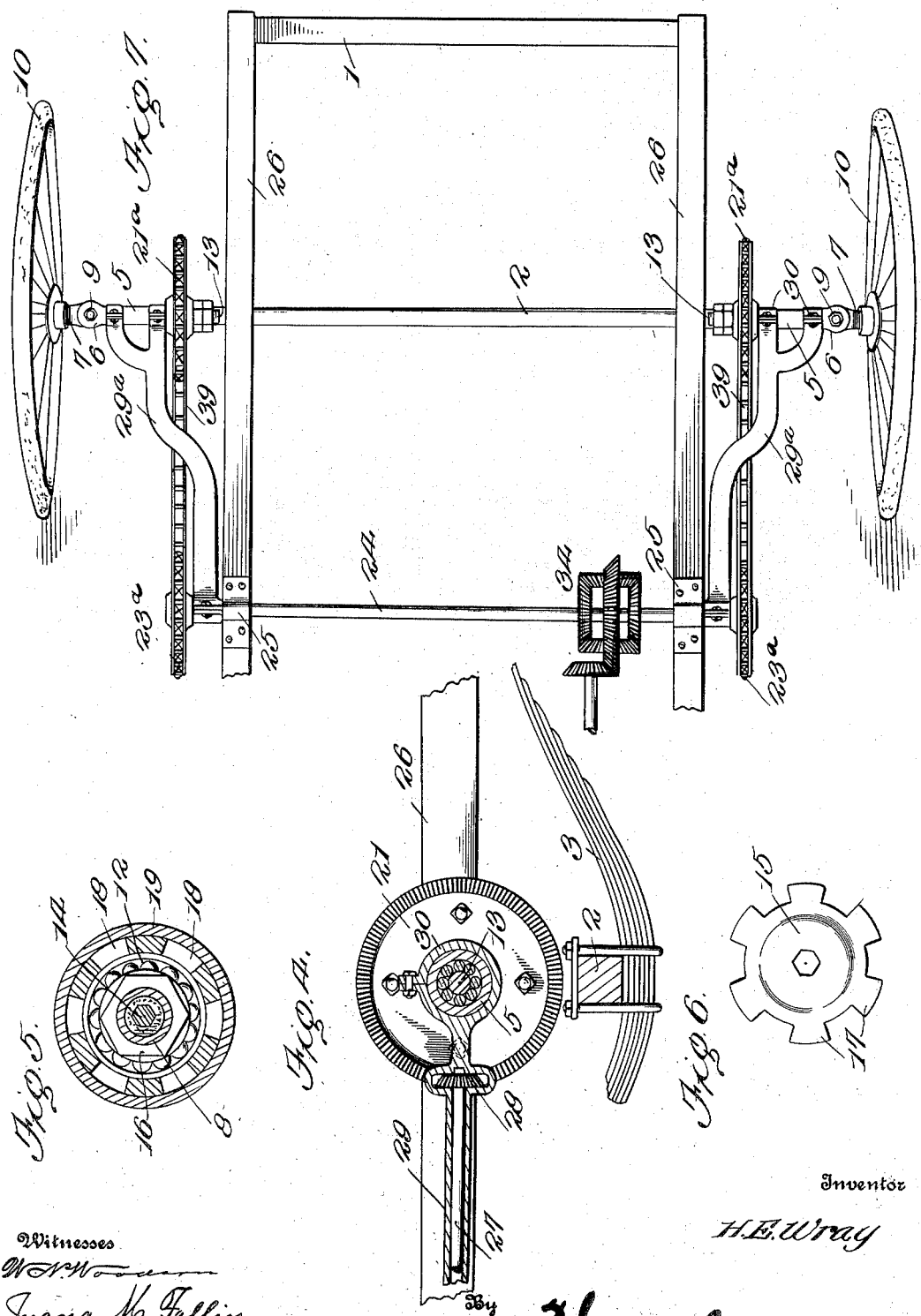
H. E. WRAY.
RUNNING GEAR FOR MOTOR VEHICLES.
APPLICATION FILED JUNE 4, 1909.
967,698. Patented Aug. 16, 1910.
3 SHEETS—SHEET 3.

UNITED STATES PATENT OFFICE.

HORACE E. WRAY, OF UKIAH, CALIFORNIA.

RUNNING-GEAR FOR MOTOR-VEHICLES.

967,698.      Specification of Letters Patent.      Patented Aug. 16, 1910.

Application filed June 4, 1909. Serial No. 500,156.

*To all whom it may concern:*

Be it known that I, HORACE E. WRAY, a citizen of the United States, residing at Ukiah, in the county of Mendocino and State of California, have invented certain new and useful Improvements in Running-Gear for Motor-Vehicles, of which the following is a specification.

The present invention comprehends certain new and useful improvements in motor vehicles, relating more particularly to the running gear thereof, and the object of the invention is an improved radius rod which extends between the drive shaft on the axle and the power shaft on the vehicle body and which serves to maintain the shafts at a constant distance apart in order to prevent any interference with the transmission gearing between said shafts upon the yielding movement of the vehicle frame relative to the axle.

A further object of the invention is a radius rod which is bifurcated at one end and has the bifurcations mounted on a bearing sleeve carried by the upturned end of the axle, the bifurcations being disposed on opposite sides of the upturned axle end so as to brace the parts and materially increase the strength of the structure.

For a full understanding of the invention and the merits thereof and also to acquire a knowledge of the details of construction, reference is to be had to the following description and accompanying drawings, in which:

Figure 1 is a top plan view, with parts in section, of a vehicle running gear embodying the improvements of my invention; Fig. 2 is a transverse vertical section illustrating the connection between one of the vehicle wheels and the axle; Fig. 3 is a horizontal section on the line 3—3 of Fig. 2; Fig. 4 is a vertical section on the line 4—4 of Fig. 2; Fig. 5 is a section on the line 5—5 of Fig. 2; Fig. 6 is a detail view of one of the disks for interlocking with the hub; and, Figs. 7 and 8 are fragmentary top plan views illustrating other embodiments of the invention.

Corresponding and like parts are referred to in the following description and indicated in all the views of the drawings by the same reference characters.

Referring to the drawings, the numeral 1 designates the vehicle frame which is of general rectangular form and which is yieldingly supported on front and rear axles 2 by means of interposed springs 3. The axles are substantially yoke-like and embrace the frame, so as not to interfere with the free action of the springs. Each of the upturned ends 4 of the axles carries at its upper end a horizontal bearing sleeve 5 that extends laterally on both sides thereof and is formed at its outer end with vertically spaced pivot arms 6. These pivot arms are preferably bifurcated to interlock with the respective pivot arms 7 carried at the inner end of a hollow spindle 8. Pintles 9 are passed through the corresponding pivot arms to establish a hinge connection between the bearing sleeve and the spindle and admit of the latter turning about a substantially vertical axis to effect the swinging movement of the wheel 10 mounted thereon, to steer the vehicle. The vehicle wheel may be of any desired or approved construction or design and has its hub 11 preferably mounted on the spindle with ball or like anti-friction bearings 12. In the present instance this wheel is "dished", as will be observed by reference to Fig. 2, and the spindle 8 is supported in a slightly inclined position to compensate for the dish of the wheel and maintain the lower portion thereof at right angles to the ground.

Journaled respectively in the bearing sleeve 5 and the hollow spindle 8 are two short drive shafts 13 and 14 that are united at their adjacent ends by means of a universal joint which is interposed between the interlocking pivot arms and is arranged in the vertical line of the axis of the spindle. A disk 15 is fitted on a square portion at the outer end of the shaft 14 and is detachably retained thereon by nuts 16. This disk extends across the outer end of the hub 11 and is designed to be suitably attached thereto, so as to cause the hub to turn with the shaft 14. In the present instance the disk and hub have an interlocking connection, as best illustrated in Figs. 5 and 6, the disk being formed with a plurality of outstanding projections or keys 17 which correspond with and are seated in recesses 18 provided in the adjacent end of the hub. A cap 19 is arranged to screw on threads 20 formed on the periphery of the hub, to inclose the disk 15 and protect the parts from dirt, moisture and the like.

The drive shaft 13 projects inwardly beyond the bearing sleeve 5 and carries a drive wheel 21 which, for convenience, has its toothed periphery detachably secured thereto by bolts or other suitable fastening elements. This drive wheel is designed for operative connection with a gear wheel 23 provided on the end of a transverse shaft 24 that is journaled in bearings 25 secured to the side sills 26 of the vehicle frame. In the preferred embodiment of the invention I employ for this purpose, a longitudinal countershaft 27 which is equipped at its opposite ends with pinions 28 that mesh respectively with the wheels 21 and 23. The countershaft is journaled on a radius rod 29 which is bifurcated at one end with the bifurcations 30 rotatably mounted on the bearing sleeve 5 on opposite sides of the upturned axle 4 (see Fig. 2). At its other end the radius rod is rotatably mounted on an outstanding cylindrical portion of the bearing 25. By virtue of this construction the pinions 28 are retained in engagement with the wheels 21 and 23 during the operation of the vehicle springs 3, while the axle 2 is further secured to the frame 1 and the structure as a whole is braced.

There are two transverse shafts 24 each of which is connected with the respective wheels of the adjacent axle, the connection between each of the vehicle wheels and the corresponding shaft 24 being substantially the same, and hence only one of these connections has been specifically described. The transverse shafts 24 are both driven from a longitudinal shaft 32 which is operatively connected to the motor 33 of the vehicle, the shaft 32 and the shafts 24 being provided with compensating gearing 34 in order to admit of the wheels turning at different speeds when rounding a curve.

In practice it has been found desirable to effect the vertical adjustment of the spindles 8 in order to regulate the angular disposition of the wheels 10 to the surface of the road. This object is attained by forming one of the pivot arms 7 of each spindle, preferably the upper arm, with a recess 35 that leads from one end thereof. Slidingly fitted in this recess is a bearing block which is constructed in two duplicate sections 36 arranged to encircle the pintle 9. The bearing block is retained in position in the recess by means of a plate 37 detachably secured to the end of the pivot arm by bolts, screws or like means. Washers 38 or their equivalents are interposed between the bearing block and the end wall of the recess and the bearing block and the plate 37 to maintain the block in adjusted position in the recess. By inserting or removing these washers the spindle 8 may be vertically adjusted so as to assume a horizontal or different inclined positions.

From the foregoing description in connection with the accompanying drawings, it will be apparent that I have provided an improved running gear for motor vehicles which is particularly efficient and admits of power being applied to all of the wheels of the vehicle without interfering with the movement thereof for steering purposes; which includes an improved connection between the axle and the spindle to render the latter capable of vertical adjustment; which embodies to a marked degree the characteristics of simplicity, durability and strength; and which consists of comparatively few parts that are not likely to get out of order.

Fig. 7, illustrates a modified form of the invention wherein the countershafts 27 are dispensed with and a drive chain 39 utilized for operatively connecting the wheels 21$^a$ and 23$^a$. The radius rod 29$^a$ is employed in this form however, to maintain the drive chain taut during the operation of the springs 3.

In a still further embodiment of the invention the wheels, 21$^b$ and 23$^b$, mesh, as illustrated in Fig. 8, the radius rod 29$^b$ being employed to prevent the gear wheels from becoming disengaged during the operation of the vehicle springs. The radius rod 29$^b$ is preferably doubled upon itself at an intermediate point, as indicated at 40, in order to embrace the wheel 23$^b$.

Having thus described the invention what is claimed as new is:

1. The combination of an axle having an up-turned end, a bearing sleeve carried by the up-turned end and extending on both sides thereof, a drive shaft journaled in the bearing sleeve, a vehicle wheel rotatable with the drive shaft, a frame yieldably supported on the axle, a power shaft journaled on the frame, means for transmitting power from the power shaft to the drive shaft, and a rigid rod connecting the axle and the frame and pivotally mounted at one end to turn concentrically with the power shaft, the rod being bifurcated at its other end with the bifurcations rotatably mounted on the bearing sleeve on opposite sides of the upturned axle end.

2. The combination of an axle having an upturned end, a bearing sleeve carried at the extremity of the unturned end and extending on both sides thereof, a spindle carried by the bearing sleeve, a vehicle wheel journaled on the spindle, a drive shaft journaled in the bearing sleeve and operatively connected to the vehicle wheel, a drive wheel rigid with the drive shaft, a vehicle frame yieldingly supported on the axle, a power shaft journaled on the vehicle frame, means for transmitting power from the power shaft to the drive wheel, and a radius rod mounted at one end on the power shaft, the rod being bifurcated at its other end with the bifurcations mounted on the bearing sleeve on opposite sides of the upturned axle end.

In testimony whereof I affix my signature in presence of two witnesses.

HORACE E. WRAY. [L. S.]

Witnesses:
 JOHN F. SCANNELL,
 A. M. VAN NUYS.